United States Patent
Gill et al.

(10) Patent No.: US 7,362,980 B2
(45) Date of Patent: *Apr. 22, 2008

(54) DUOBINARY TRANSMISSION SYSTEM AND METHOD

(75) Inventors: Douglas M. Gill, South Orange, NJ (US); David S. Levy, Freehold, NJ (US); Xiang Liu, Marlboro, NJ (US); Moncef B. Tayahi, Holmdel, NJ (US); Xing Wei, New Providence, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 503 days.

This patent is subject to a terminal disclaimer.

(21) Appl. No.: 10/356,203

(22) Filed: Jan. 31, 2003

(65) Prior Publication Data

US 2004/0151512 A1    Aug. 5, 2004

(51) Int. Cl.
H04B 10/12    (2006.01)
H04B 10/04    (2006.01)

(52) U.S. Cl. .................... 398/192; 398/147; 398/183; 398/193

(58) Field of Classification Search ............... 398/193, 398/192, 183, 147
See application file for complete search history.

(56) References Cited

U.S. PATENT DOCUMENTS 5,543,952 A * 8/1996 Yonenaga et al. .......... 398/185
5,867,534 A 2/1999 Price et al. ................. 375/286
6,188,497 B1 * 2/2001 Franck et al. ............... 398/183
6,577,792 B2 * 6/2003 Brennen et al. ............. 385/37
7,024,057 B2 * 4/2006 Li et al. ........................ 385/3

OTHER PUBLICATIONS

"Reduced bandwidth optical digital intensity modulation with improved chromatic dispersion tolerance" by A.J. Price and N. Le Mercier, Electronics Letters, Jan. 5, 1995, vol. 31, No. 1.*
"A novel Electrically Tunable Dispersion Compensation System", Maria J. Erro et al., IEEE Journal of selected Topics in Quantum Electronics, vol. 5, No. 5, Sep./Oct. 1999.*
"Demonstration of Optical Duobinary Transmission System Using Phase Modulator and Optical Filter" Hoon Kim, IEEE Photonic technology letters, vol. 14, No. 7, Jul. 2002.*
"Monolithic optical waveguide 1.31/1.55um WDM with -50dB crosstalk over 100nm bandwidth"☐☐Y.P. Li; Electronics letters, p. 2100-2101, vol. 31, No. 24, Nov. 23, 1995.*
B. Enning, "Signal Shaping For Optical Wideband Transmission Systems Using The Inherent Lowpass Behavior of Counterpropagating Optical and Electrical Signals in a LiNbO$_3$, Mach-Zehnder Modulator", *Journal of Optical Communications*, 22 (2001) 746. p. 1-4.

* cited by examiner

Primary Examiner—Shi K. Li
Assistant Examiner—Wai Lun Leung

(57) ABSTRACT

An optical duobinary transmission system and method are provided for transmitting optical duobinary signals across an optical transmission link having residual dispersion. The system includes a transmitter having a low bandwidth modulator, adapted to provide filtering for low pass filtered duobinary transmission. The transmission link is designed such that the residual dispersion of the transmission link substantially compensates for signal distortion from the transmitter.

24 Claims, 6 Drawing Sheets

DUOBINARY TRANSMISSION SYSTEM AND METHOD

REFERENCE TO RELATED APPLICATION

This application relates to a co-pending application entitled "Apparatus And Method For Duobinary Transmission" filed even date herewith and is hereby incorporated by reference.

FIELD OF THE INVENTION

The present invention relates generally to duobinary transmission and, more particularly, to an optical transmission system and method for low pass filtered duobinary transmission.

BACKGROUND OF THE INVENTION

Optical duobinary transmission is a well-known modulation format in fiber optic communications. The duobinary transmission format is potentially a cost effective commercial fiber optic data transport solution, particularly for metropolitan applications. Characteristics that help make duobinary transmission potentially cost effective include a high tolerance to accumulated and/or residual dispersion, flexible requirements with respect to the placement of dispersion compensation units within a transmission system, a high tolerance to nonlinear penalty, and relatively low bandwidth requirements for the optical transmitter.

The optical duobinary transmission format transmits binary data using three states, often denoted as plus-one (+1), zero (0), and minus-one (−1). The plus-one and minus-one states are differentiated by a 180 degree optical phase shift. An optical duobinary data stream is typically created by driving a single Mach-Zehnder modulator (MZM) with a three level electrical drive. The modulator is biased at the null point in its transfer function and driven with an electrical signal that has three levels, where the upper and lower rails of the drive signal are separated by two times the required switching voltage of the modulator. This creates a three state optical output from the modulator where the upper and lower rails of the electrical drive signal produce a plus-one and minus-one state, respectively, and the middle state of the electrical drive signal creates a zero state from the modulator.

One technique for realizing an optical duobinary data stream is to create the required three-level electrical drive signal, used to drive the optical modulator, by filtering a differentially encoded binary NRZ data stream with a low pass electrical filter. This technique is referred to herein as the electrical low pass filtered (LPF) duobinary approach. An example of an optical transmission system using conventional electrical LPF duobinary is shown in FIG. 1.

Electrical LPF duobinary transmission uses an optical Mach-Zehnder modulator (MZM) biased at a null point in its transfer function and driven at about two times its required switching voltage (2*V). In such a configuration the required response bandwidth of the driver/filter/modulator combination to an input impulse is much lower than that needed for an NRZ transmitter. However, for optimal performance in, for example, a 10 Gb/s electrical LPF duobinary transmitter, a 3 GHz bandwidth first-order Gaussian low pass electrical filter is used as the 'bandwidth bottleneck' or bandwidth limiter. The bandwidth of the modulator and electrical driver in such a configuration are made to be significantly larger than the Gaussian electrical filter pass band in order to let the carefully designed filter create an appropriate spectral content for the data stream. Therefore, the 3 GHz electrical filter response dominates the transmitter response and is indicative of the preferred aggregate driver/filter/modulator response of the transmitter. Significant deviations from this ideal response, in bandwidth and/or response ripple, tend to seriously degrade the quality of the signal at the output of the transmitter. Therefore, great care is taken in achieving the proper transmitter response for use in a commercial transmission system.

It is important to note that, within typical electrical LPF duobinary transmitter circuits, impedance matching must be maintained between various components within the circuit including the amplifier, electrical filter and modulator in order to minimize signal reflections. Reflections between the electrical filter and modulator, for example, can seriously degrade the back-to-back performance of a filtered duobinary transmitter. (Back-to-back performance of the duobinary transmitters as used herein, refers to the quality of the data stream at the output of the transmitter without transmission across a transmission link.) To avoid signal reflections great care must be taken to minimize impedance mismatches within the transmitter. Such stringent transmitter specifications tend to substantially increase transmitter component costs. Accordingly, relaxing the constraints on the transmitter architecture would significantly improve transmitter cost and yield and thus reduce overall system costs.

It has been demonstrated that an approximate filtering function for realizing a duobinary data stream can be created within the response of a Mach-Zehnder electro-optic modulator (see Enning, "Signal Shaping For Optical Wideband Transmission Systems Using Inherent Lowpass Behavior of Counterpropagating Optical and Electrical Signals in a $LiNbO_3$ Mach-Zehnder Modulator", *J. Opt. Commun.* 22 (2001) 746 pp. 1-5, 2001). The Enning device employs an idealized magnitude sinc function response for the modulator. However, such a device response is not realistic for practical devices or for higher bit rate (e.g. ~10 Gb/s) applications. The use of a modulator with a sinc magnitude response has a monotonic decrease in the quality of the data pattern with an increase in residual dispersion. Therefore, the sinc response modulator creates a data pattern that is not as robust against accumulated dispersion within a transmission link. Enning does not consider the relative quality or applicability of his proposed device in transmission systems having residual dispersion.

It has also been recognized that residual dispersion from transmission can improve the quality of an electrical LPF duobinary data stream. Specifically, it is understood that the optical spectral components that make up an electrical LPF duobinary data stream are not optimally aligned when initially transmitted; however, after propagation in standard single mode fiber (SSMF) dispersion can realign some of the spectral components within the bit stream such that the eye diagram improves, resulting in an improved optical signal to noise ratio requirement for a given bit error ratio. However, it has not previously been understood that the amount of improvement in the electrical LPF duobinary data stream produced by residual dispersion varies significantly with the initial quality of the bit pattern. That is, it has not been previously recognized that a lower quality duobinary data stream generated using a transmitter having a low bandwidth modulator can be dramatically improved with an appropriate amount of residual dispersion, and that a relatively high quality duobinary data stream shows significantly less improvement.

Accordingly, a need exists for an optical duobinary transmission system and method for higher bit rate transmission applications, which are practical, relatively less technically complex and are cost effective.

SUMMARY OF THE INVENTION

One aspect of the invention provides an optical duobinary transmission system comprising a transmitter including a low bandwidth modulator, adapted to provide filtering for low pass filtered duobinary transmission, having a bandwidth of less than the transmission bit rate of the transmitter, and an optical transmission link having residual dispersion. The transmission link is designed such that the residual dispersion of the transmission link substantially compensates for signal distortion from the transmitter.

Another aspect of the invention provides a method for optical duobinary transmission in a transmission system comprising providing a transmitter including a low bandwidth modulator, adapted to provide filtering for low pass filtered duobinary transmission, having a bandwidth of less than the transmission bit rate of the transmitter, and providing an optical transmission link having residual dispersion. The transmission link is modified such that the residual dispersion of the transmission link substantially compensates for signal distortion from the transmitter. Modifications to the transmission link can include under-compensating the dispersion in the link by about 10% so that the total residual dispersion after 1000 km is approximately an optimum value. The under-compensation allows the use of dispersion compensation modules (DCMs) with less dispersion and thus lowers the cost of the transmission system. Under-compensation in combination with the dispersion tolerance of duobinary transmission in duobinary systems according to the invention also allows for larger spacing between DCMs, which lowers the overall cost of DCMs and amplifiers needed in a system.

DETAILED DESCRIPTION OF THE INVENTION

Figure 1:
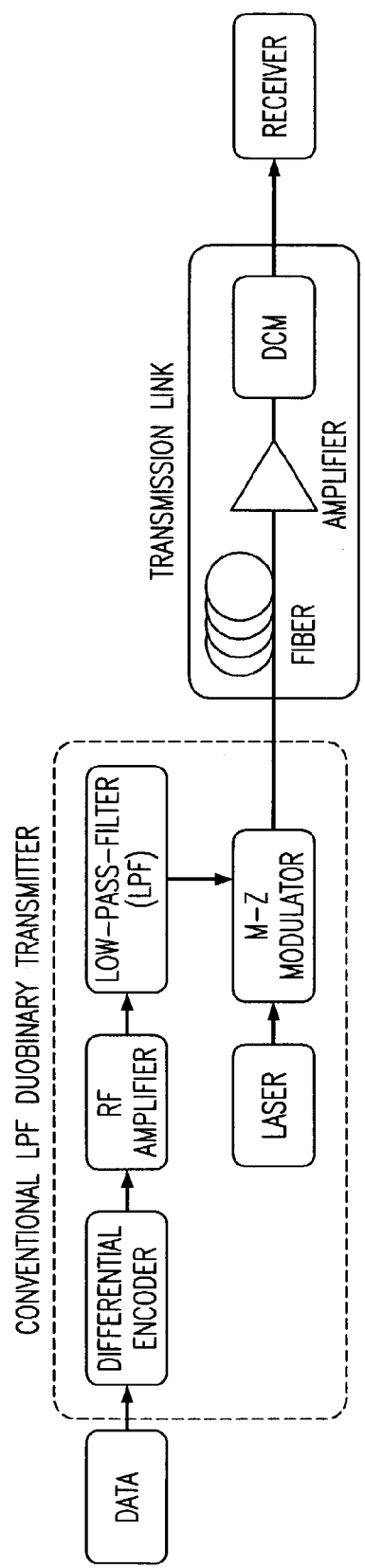
FIG. 1 is a schematic diagram of a prior art electrical LPF duobinary transmitter and transmission link.

The present invention provides an optical duobinary transmission system and method, which allow for relaxed response requirements and fabrication tolerances for optical duobinary transmission systems. In one preferred embodiment of the invention, shown in FIG. 2, a duobinary transmission system 200 is provided which includes a duobinary transmitter 210 and one or more transmission links 215 having residual dispersion. 'Transmission links' as used herein, refers to transmission apparatus or system components between a transmitter and a receiver. Residual dispersion as used herein refers to dispersion accumulated in a transmission link up to a point just prior to a receiver.

The duobinary transmitter 210 preferably includes a differential encoder 220, an RF amplifier 230, a Mach-Zehnder modulator 240, and a laser 250.

Figure 2:
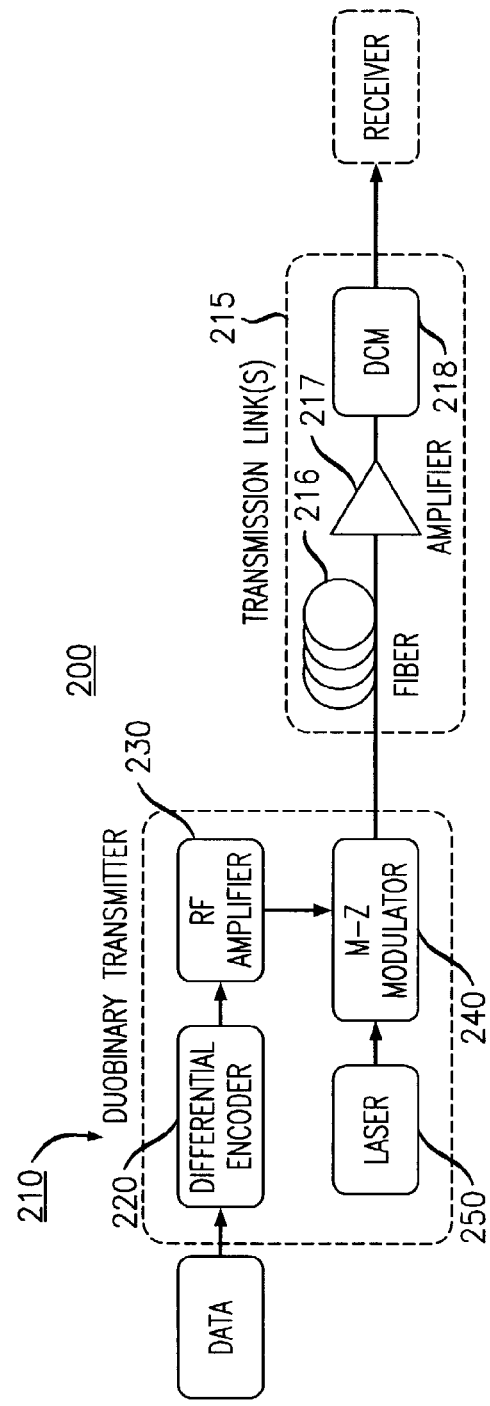
FIG. 2 is a schematic diagram of one embodiment of a duobinary transmission system according to the invention.

The transmission link 215 preferably includes one or more transmission fibers 216, one or more optical amplifiers 217 and one or more dispersion compensating modules 218. The transmission link 215 can however, include any transmission apparatus or system components that are necessary or appropriate for a desired application. Such components also include but are not limited to optical add-drop units and the like. As shown in FIG. 2, the transmitter 210 and the transmission link(s) 215 may be coupled to a receiver.

The differential encoder 220 of the transmitter 210 is used to convert an electrical binary input signal to a differentially encoded signal that is then used to drive an appropriately configured Mach-Zehnder modulator 240 to produce an optical duobinary signal for transmission across the transmission link 215.

The RF amplifier 230 is provided to amplify the duobinary signal prior to driving the modulator 240. It is understood that the RF amplifier 230 is needed only if the power output from the differential encoder 220 is not sufficient to drive the modulator 240. The RF amplifier 230 can be removed entirely from the transmitter 210 architecture if the differential encoder 220 output is sufficient to drive the modulator 240.

The modulator 240 is arranged to modulate the optical signal provided by the laser 250 according to the driving signal supplied through the differential encoder 220 and the RF amplifier 230. The modulator 240 is biased at a null point, and the driving signal is low-pass filtered by the modulator response function in such a way that the modulated optical signal is a duobinary signal.

Preferably, the duobinary transmitter response needed for duobinary transmission is realized using the modulator 240. As can be understood from FIG. 1, prior art electrical LPF duobinary transmitters and transmission systems included electrical low pass Gaussian filters having a 3-db bandwidth (in GHz) of approximately ¼ of the bit rate (in Gb/s) that creates the required filtering within the duobinary transmitter. In contrast, the duobinary transmission system 200, in accordance with an embodiment of the present invention, uses a modulator 240 to limit the frequency response of the transmitter 210.

The modulator 240 is preferably a low bandwidth modulator having a bandwidth (in GHz) of less than the transmission bit rate of the transmitter (in Gb/s), that is adapted to provide an appropriate response such that Gaussian electrical filtering is not necessary within the transmitter 210 architecture. More preferably, the modulator 240 has a bandwidth of less than about 60% of the transmission bit rate of the transmitter 210. Specifically, the modulator 240 preferably indicates the lower limit of the allowable frequency response of the transmitter 210. The use of such low bandwidth modulators allows for the use of lower modulator drive voltages. Such an architecture provides a practical cost-effective solution for duobinary transmission.

It should be understood, however, that the present invention is not limited to transmission systems having transmitters without electrical filters, but is instead applicable to any system (1) having transmitter in which the modulator is adapted to provide filtering for low pass filtered duobinary transmission without the need for additional electrical filtering which dominates the response of the transmitter, and (2) having residual dispersion in the transmission link which substantially compensates for the signal distortion from the transmitter.

Figure 3:
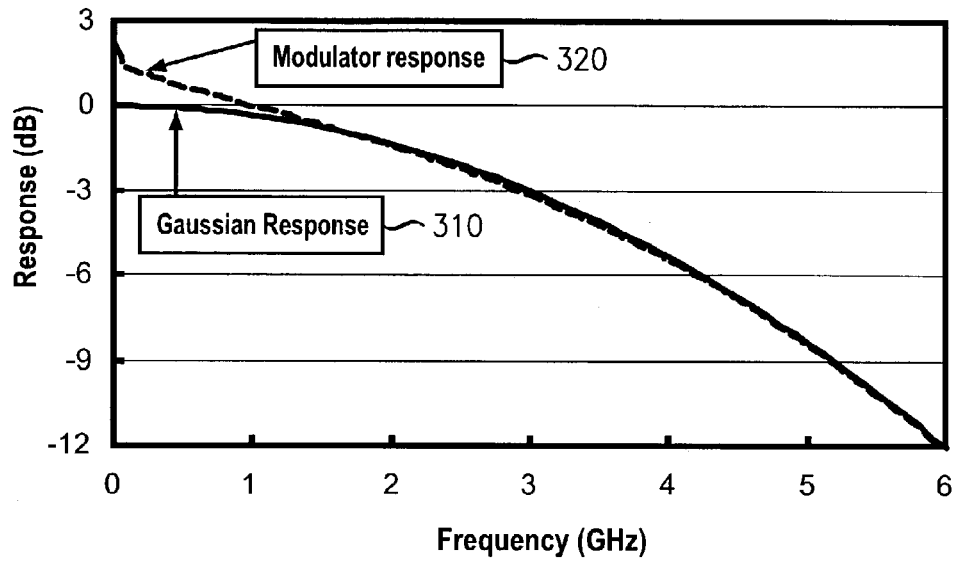
FIG. 3 is a plot showing the simulated magnitude response of a Mach-Zehnder modulator (solid line) and a low pass 3 GHz Gaussian electrical filter (dashed line)

As an example, we consider a 3 GHz bandwidth first-order Gaussian low pass electrical filter response 310, shown in FIG. 3, as is used in typical electrical LPF duobinary transmitters for 10 Gb/s transmission. For LPF duobinary applications the preferred magnitude response 310 is as shown in FIG. 3, and the preferred phase response 410 is flat across the pass band of the filter, as shown in FIG. 4.

A simulation was performed which modeled a 10 Gb/s optical duobinary transmitter having a low-bandwidth Mach-Zehnder modulator for use in a transmission system in accordance with one embodiment of the invention. It is understood, however, that transmission systems according to the invention can be generalized to optical duobinary transmission systems for transmission at various bit rates (e.g. 40 Gb/s) by proportionally scaling the modulator bandwidth of the transmitter.

The response function 320 of the low-bandwidth modulator is shown in FIG. 3. The physical parameters of the modulator used in the simulation are as follows: n_RF=3.7, n_opt=2.1385, device length=2.5 cm, RF_loss_factor =−0.7 dB/cm/sqrt(cm). The high frequency response of the low-bandwidth modulator is predominantly limited by the velocity mismatch between the microwave and optical field propagation constants in the modulator interaction region. However, the electrode loss plays a larger role in the frequency response of the device below 1 GHz. As can be seen from FIG. 3, there is a deviation between the Gaussian 310 and the modulator response 320 below 1 GHz. Furthermore, we note that the bandwidth of the modulator response shown in FIG. 3 (i.e. the frequency at which the magnitude response of the modulator is reduced by 3 dB) is ~2 GHz.

Figure 4:
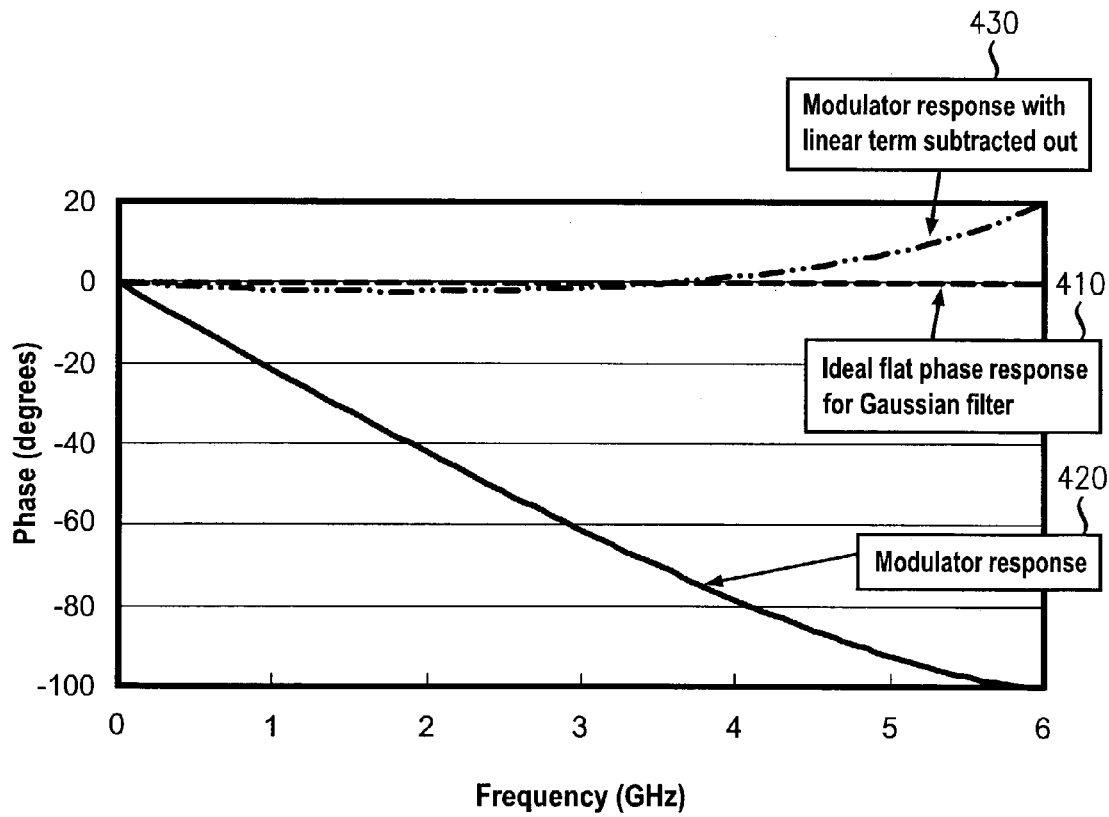
FIG. 4 is a plot showing the phase response of a Mach-Zehnder modulator for use in one embodiment of the invention and the phase response from an ideal low pass 3 GHz Gaussian electrical filter.

The phase response 420 of the low-bandwidth modulator is shown in FIG. 4. We note that since group delay is the rate of change of the total phase shift with respect to angular frequency, the phase response of the modulator can be plotted with the subtraction (or addition) of a factor that is linearly dependent on frequency. This, in essence, is equivalent to creating a time delay (or advancement) in the measured output of the modulator. Accordingly, the phase response of the low-bandwidth modulator with the addition of a factor that increases linearly with frequency 430, is also shown in FIG. 4.

As can be seen from FIG. 4, the phase response 430 of the low-bandwidth modulator has relatively small (±5 degrees) deviation from an ideal linear response 410. Thus, the major impact that the modulator phase response has in the frequency range of interest (e.g. <5 GHz) is to produce a time delay in the output data stream from the modulator, and that the output data stream from the modulator is otherwise left relatively intact. Thus, the response of the modulator substantially replicates the ideal filter function needed for duobinary transmission, except for the magnitude response deviation below 1 GHz caused by electrode loss, which could be corrected by some other effects such as frequency-dependent impedance matching. Even with this deviation (and other deviations), residual dispersion in the transmission link substantially mitigates the penalty.

Figure 5:
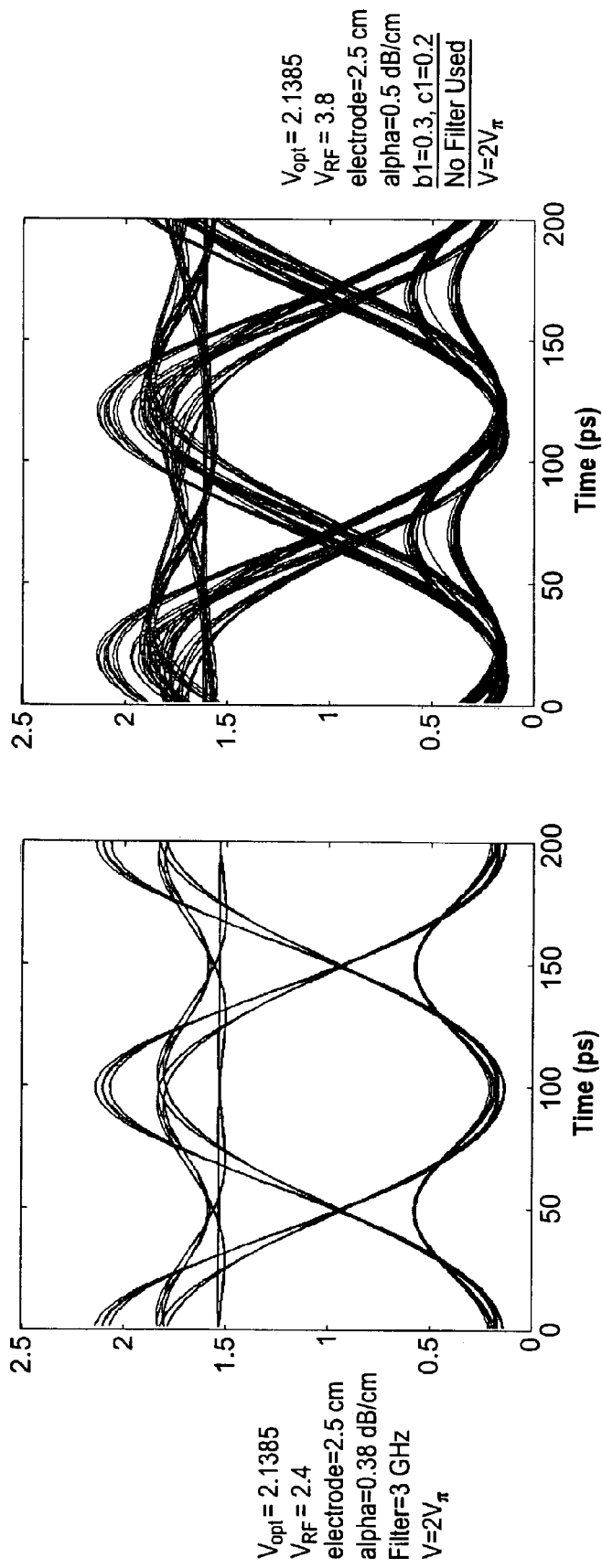
FIGS. 5 a-b show eye diagrams from simulations using a standard electrical LPF duobinary transmitter and a duobinary transmitter for use in an embodiment of the present invention, respectively.

FIG. 5a shows the eye diagram from a simulation of the linear transmission of a 10 Gb/s duobinary data stream. The data stream was propagated in a transmission system across 100 km of standard single mode fiber and was created with an electrical LPF duobinary transmitter (with a 3 GHz filter).

FIG. 5b also shows the eye diagram from a simulation of the linear transmission of a 10 Gb/s duobinary data stream. The data stream was created by a duobinary transmitter with a low bandwidth MZ modulator and was propagated in a transmission system in accordance with the present invention across 100 km of standard single mode fiber.

The RF driver bandwidth of the duobinary transmitter of the system according to the invention was set such that it was much larger than that of the modulator. Thus, the duobinary transmitter response was dominated by the Mach-Zehnder modulator response. As can be seen from FIGS. 5a-b, the resulting eye diagrams after 100 km of transmission on standard single mode fiber are similar for both the system using a transmitter with electrical filtering and the system according to an embodiment of the present invention using a transmitter with a low bandwidth MZ modulator.

Figure 6:
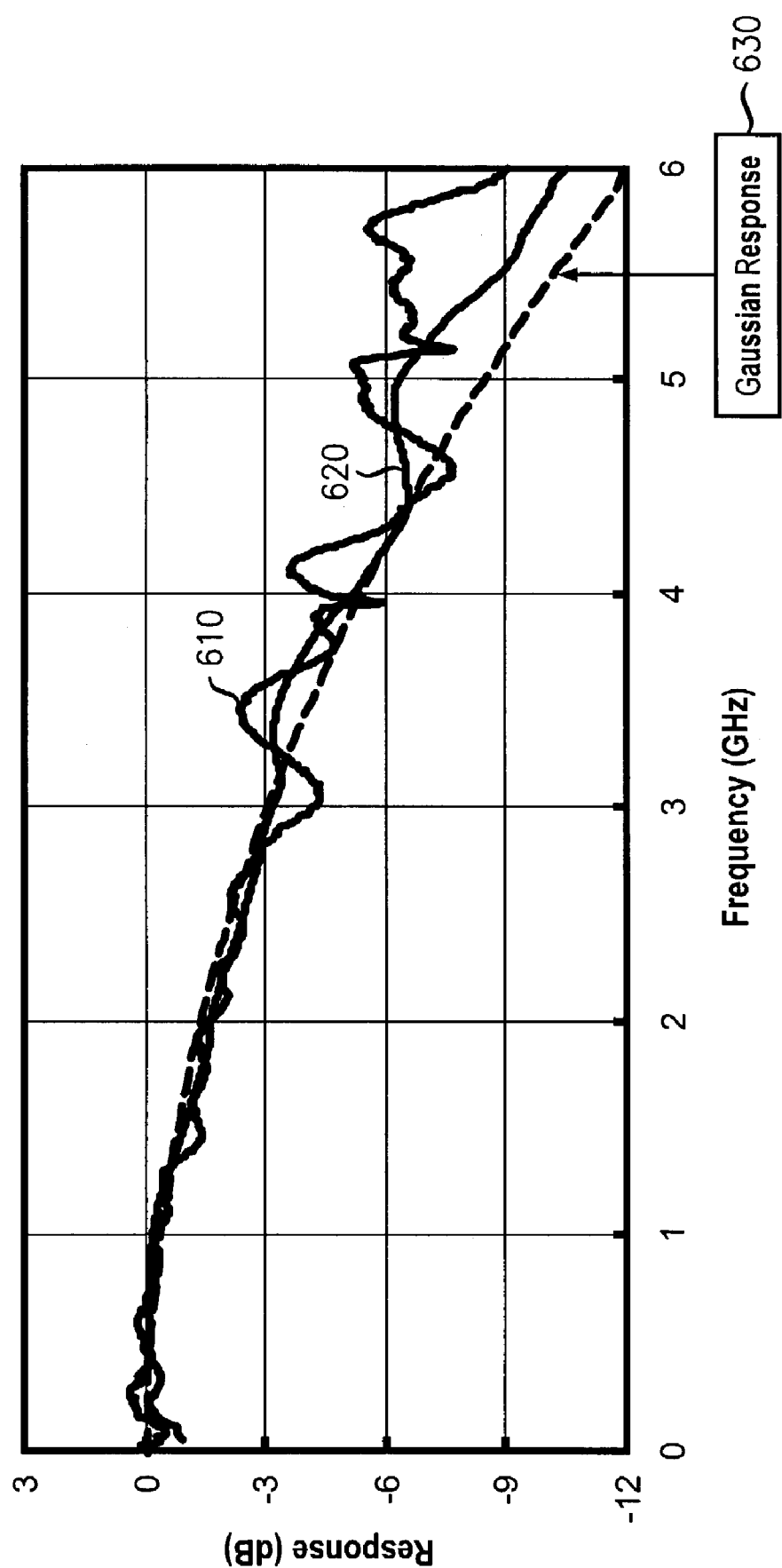
FIG. 6 is a plot showing the measured magnitude response of low-bandwidth modulators compared to an ideal low pass 3 GHz Gaussian electrical filter.

FIG. 6 shows the measured response 610, 620 from representative low-bandwidth modulators that can be used in systems in accordance with embodiments of the invention for 10 Gb/s optical duobinary transmission. As can be seen from FIG. 6, the response curves 610, 620 deviate appreciably from the response curves 310, 320 shown in FIG. 3 (e.g. intensity ripples) and from the ideal response 630 for a 3 GHz low pass Gaussian filter traditionally used for 10 Gb/s duobinary transmission with electrical LPF duobinary transmitters having high bandwidth modulators.

Figure 7:
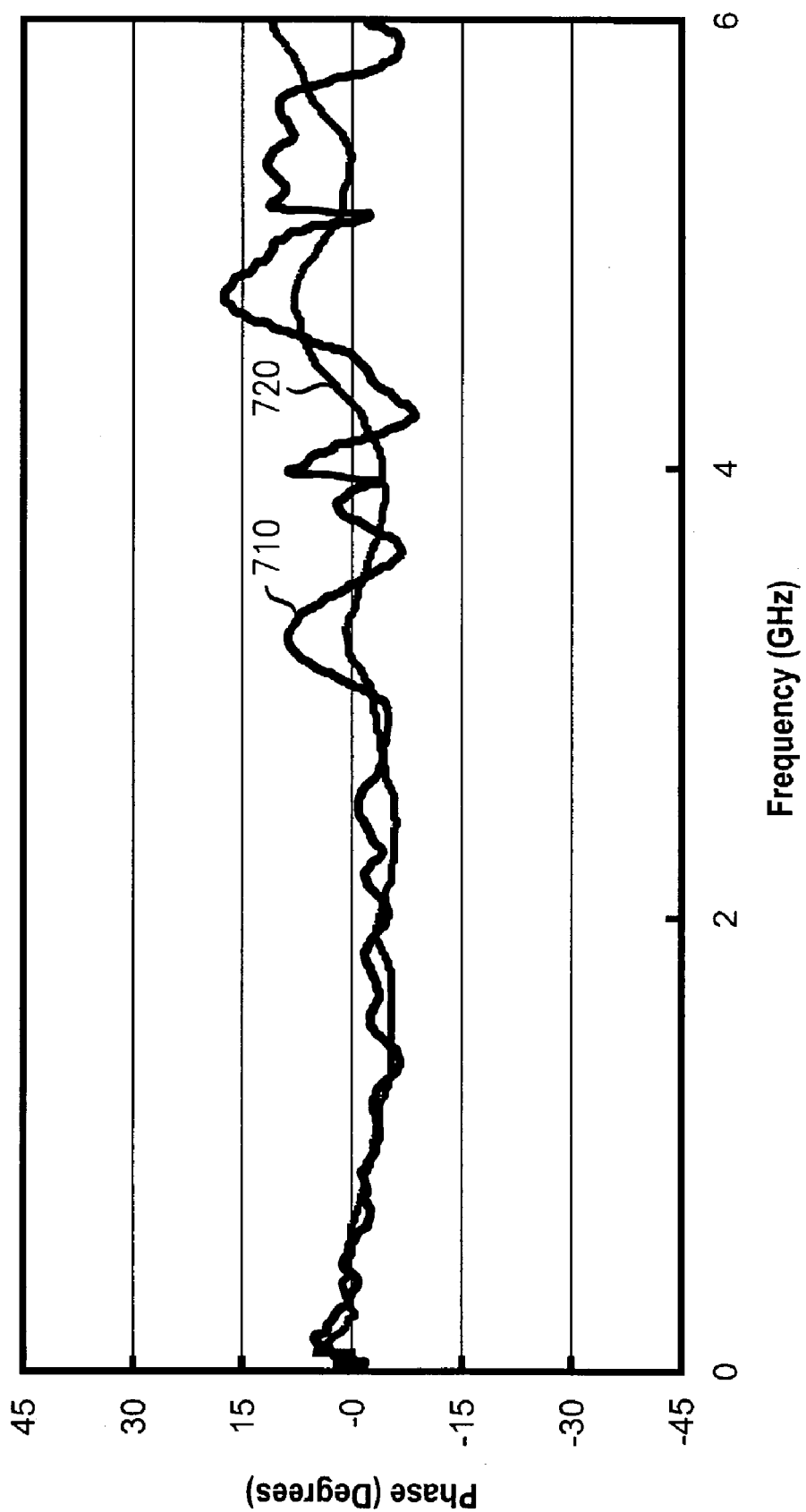
FIG. 7 is a plot showing the measured phase response of low-bandwidth modulators.

The phase response 710, 720 from the low-bandwidth modulators discussed with regard to FIG. 6 are shown in FIG. 7. As can be seen from FIG. 7, the curves 710, 720 have some irregular phase ripples.

Figure 8:
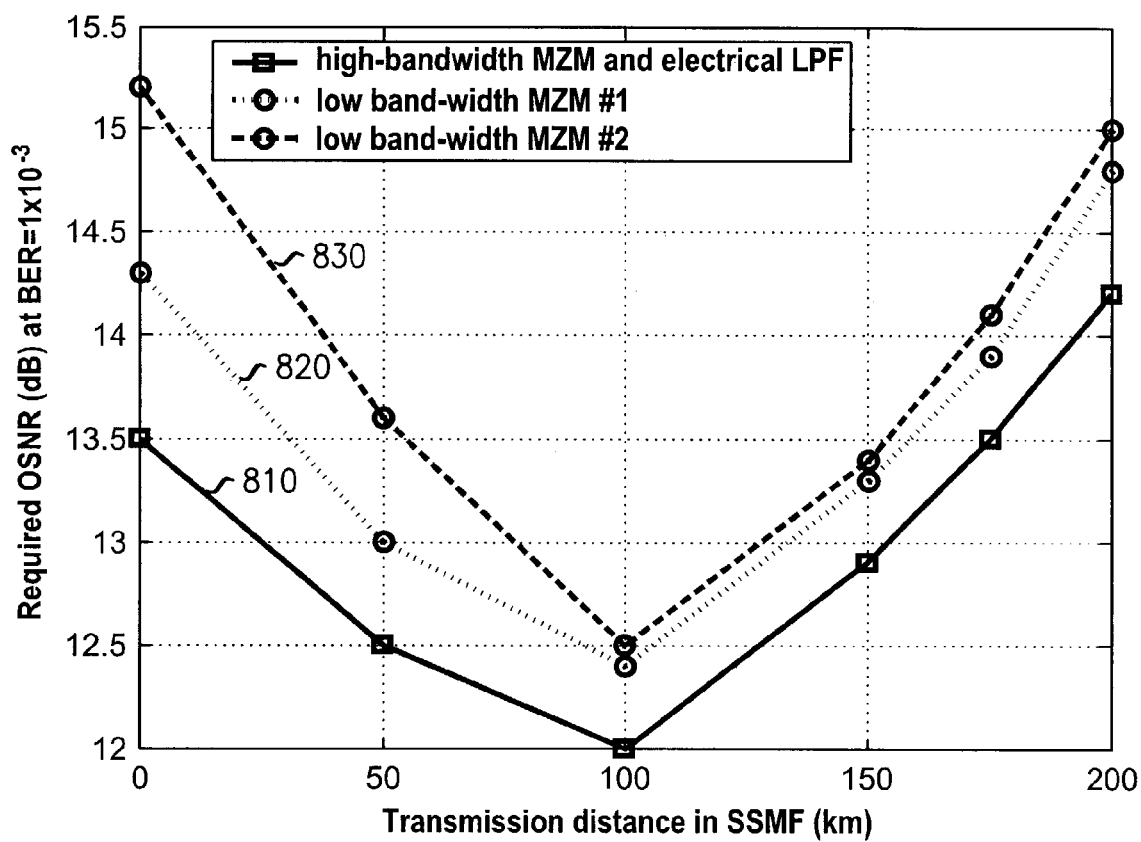
FIG. 8 is a plot showing required OSNR vs. transmission distance for systems having duobinary optical transmitters in accordance with the present invention, and an electrical LPF duobinary transmitter.

FIG. 8 illustrates the optical signal to noise ratio (OSNR) required to achieve a bit error ratio (BER) of 1E-3 using three different transmitters in a 10 Gb/s transmission system, for transmission distances up to 200 km of SSMF. Plot 810 is for a prior art 10 Gb/s electrical LPF duobinary transmission system using a transmitter having a 10 Gb/s MZ modulator. Plots 820 and 830 are for 10 Gb/s duobinary transmission system in accordance with embodiments of the invention using transmitters having low-bandwidth modulators. As can be understood from FIG. 8, the plots show the required OSNR for varying transmission distances and, accordingly, varying amounts of residual dispersion.

The required OSNR for back-to-back measurements (i.e. ~0 km of transmission) shows a significant difference of as much as ~1.5 dB. However, at ~100 km of SSMF (e.g. ~1700 ps/nm of residual dispersion) the difference in required OSNR between the electrical LPF duobinary transmission and the duobinary transmission in accordance with the present invention is significantly reduced to only about 0.5 dB. Furthermore, the duobinary transmission in accordance with the present invention perform well as compared to prior art electrical LPF duobinary transmission systems, where the absolute value of the residual dispersion in the transmission link 215 is below about 3500 ps/nm.

It is understood that the OSNR penalty from the use of a duobinary transmitter in a system according to the present invention is due, at least in part, to the response deviations of the transmitter from the ideal duobinary transmitter response. Simulations using a duobinary transmitter in a system according to the present invention indicate that a response deviation of up to a ±1 dB in the low frequency regime of the duobinary transmitter can be tolerated with a relatively small amount of OSNR penalty within a range of residual dispersion from about 600 ps/nm to about 3000 ps/nm. Although a significant back-to-back OSNR penalty can be seen from a low frequency ±1 dB response deviation, after an appropriate amount of residual dispersion, the OSNR penalty is seen to be minimal.

It can be appreciated by those skilled in the art that the improvement of a duobinary data signal in a system with residual dispersion according to the invention can reduce the impact from a variety of issues that may produce a less than ideal transmitter response. For example, with regard to impedance matching between various components within a duobinary transmitter, the impedance matching requirements between various components can be relaxed since the resulting signal distortion can be mitigated with the presence of residual dispersion within the transmission link. This is of specific interest in matching modulators with electrical drivers in duobinary transmitters since impedance variations can exist between modulators manufactured by different vendors.

Further, a significant amount of ripple in the modulator response, as was seen in the low-bandwidth modulators discussed above, can be tolerated as long as there is an appropriate amount of residual dispersion in the transmission link. This is significant in that the aggregate response of a duobinary transmitter of a system according to the present invention need not be nearly as ideal as in prior art devices.

Thus, transmission systems according to the present invention can, for example, transmit a 10 Gb/s duobinary signal that is acceptable for commercial transmission systems, using transmitters having low-bandwidth modulators. Such modulators may be manufactured under relaxed fabrication and packaging constraints. This significantly reduces the cost of modulators used in the duobinary transmitters while maintaining performance that is acceptable for commercial 10 Gb/s transmission applications. Furthermore, the performance of the modulators used in accordance with the present invention may be further relaxed from those of presently available low-bandwidth devices to further reduce costs and improve yield.

Additionally, optical duobinary transmitters in systems according to the invention may have relaxed transmitter response criteria while maintaining good performance. Use of relaxed transmitter specifications for duobinary transmission at any bit rate can allow significant reduction in modulator costs and lower modulator drive voltage requirements. Therefore, a more efficient and cost effective approach to implementing duobinary transmission can be realized.

Additionally, the transmission links of duobinary systems according to the invention are preferably adapted such that the residual dispersion of the transmission link substantially compensates for signal distortion from the transmitter. Specifically, the residual dispersion at a receiver is preferably about $$\left(\frac{10 \text{ Gb/s}}{\text{bit rate}}\right)^2 \times 1700 \text{ ps/nm}.$$

For example, for a 10-Gb/s transmission link consisting of 10 100-km SSMF spans, the dispersion of each span is preferably under-compensated by about 10% so that the total residual dispersion after 1000 km is approximately an optimum value. The under-compensation allows the use of DCMs with less dispersion and thus lowers the cost of the transmission system.

The use of under-compensation in combination with the dispersion tolerance of duobinary transmission in duobinary systems according to the invention also allows for larger spacing between DCMs which lowers the overall cost of DCMs and EDFAs needed in a system. The cost saving (in terms of percentage) is potentially greater when transmission links are shorter. For example, for a 10-Gb/s transmission link consisting of 5 100-km SSMF fiber spans, the dispersion of each transmission link may be under-compensated by about 20%.

The present invention can be implemented using transmitters and other components having discrete components or integrated modules (e.g. transmitters having laser/modulator modules, duobinary driver/modulator modules, laser/duobinary driver/modulator modules, and the like).

The above-described embodiments of the invention are intended to be illustrative only. Numerous alternative embodiments may be devised by those skilled in the art without departing from the scope of the following claims.

What is claimed is:

1. An optical duobinary transmission system comprising:
   a transmitter including a low bandwidth modulator, operable to provide filtering for low pass filtered duobinary transmission, having a bandwidth of less than the transmission bit rate of the transmitter, and
   an optical transmission link having residual dispersion,
   wherein the transmission link is designed such that the residual dispersion of the transmission link substantially compensates for signal distortion from the transmitter, the effect of residual dispersion combined with that of the low bandwidth modulator in order to achieve a low pass filtering operation without additional electrical filters and wherein the absolute value of the residual dispersion of the optical transmission link is greater than $$\left(\frac{10 \text{ Gb/s}}{\text{bit rate}}\right)^2 \times 600 \text{ ps/nm}.$$

2. The transmission system of claim 1 wherein high frequency response of the modulator is predominately limited by a velocity mismatch between microwave and optical field propagation constants in a modulator interaction region.

3. The transmission system of claim 1 wherein the absolute value of the residual dispersion of the optical transmission link is below about $$\left(\frac{10 \text{ Gb/s}}{\text{bit rate}}\right)^2 \times 3500 \text{ ps/nm}.$$

4. The transmission system of claim 1 wherein the modulator bandwidth is less than about 60% of the transmission bit rate of the optical transmission system.

5. The transmission system of claim 1 wherein the transmitter has substantial response ripple which is substantially compensated for by the residual dispersion of the transmission link.

6. The transmission system of claim 1 wherein the low bandwidth modulator is a Mach-Zehnder modulator.

7. An optical duobinary transmission system comprising:
a transmitter including a low bandwidth modulator, operable to provide filtering for low pass filtered duobinary transmission over a transmission link having residual dispersion, having a bandwidth of less than the transmission bit rate of the transmitter,
wherein the transmission link is adapted such that the residual dispersion of the transmission link substantially compensates for signal distortion from the transmitter, the effect of residual dispersion combined with that of the low bandwidth modulator in order to achieve a low pass filtering operation without additional electrical filters and wherein the absolute value of the residual dispersion of the optical transmission link is greater than $$\left(\frac{10 \text{ Gb/s}}{\text{bit rate}}\right)^2 \times 600 \text{ ps/nm}.$$

8. The transmission system of claim 7 wherein high frequency response of the modulator is predominately limited by a velocity mismatch between microwave and optical field propagation constants in a modulator interaction region.

9. The transmission system of claim 7 wherein the absolute value of the residual dispersion of the optical transmission link is below about $$\left(\frac{10 \text{ Gb/s}}{\text{bit rate}}\right)^2 \times 3000 \text{ ps/nm}.$$

10. The transmission system of claim 7 wherein the modulator bandwidth is less than about 60% of the transmission bit rate of the optical transmission system.

11. The transmission system of claim 7 wherein the transmitter has substantial response ripple which is substantially compensated for by the residual dispersion of the transmission link.

12. The transmission system of claim 7 wherein the low bandwidth modulator is a Mach-Zehnder modulator.

13. A method for providing optical duobinary transmission comprising:
providing a transmitter including a low bandwidth modulator having a bandwidth of less than the transmission bit rate of the transmitter and operable to provide filtering for low pass filtered duobinary transmission over a transmission link having residual dispersion; and
operating the transmission link such that the residual dispersion of the transmission link substantially compensates for signal distortion from the transmitter, the effect of residual dispersion combined with that of the low bandwidth modulator in order to achieve a low pass filtering operation without additional electrical filters and wherein the absolute value of the residual dispersion of the optical transmission link is greater than $$\left(\frac{10 \text{ Gb/s}}{\text{bit rate}}\right)^2 \times 600 \text{ ps/nm}.$$

14. The method of claim 13 wherein high frequency response of the modulator is predominately limited by a velocity mismatch between microwave and optical field propagation constants in a modulator interaction region.

15. The method of claim 13 wherein the absolute value of the residual dispersion of the optical transmission link is below about $$\left(\frac{10 \text{ Gb/s}}{\text{bit rate}}\right)^2 \times 3500 \text{ ps/nm}.$$

16. The method of claim 13 wherein the modulator bandwidth is less than about 60% of the transmission bit rate of the optical transmission system.

17. The method of claim 13 wherein the transmitter has substantial response ripple which is substantially compensated for by the residual dispersion of the transmission link.

18. The method of claim 13 wherein the low bandwidth modulator is a Mach-Zehnder modulator.

19. A method for providing optical duobinary transmission comprising:
providing a transmiller including a low bandwidth modulator, operable to provide filtering for low pass filtered duobinary transmission, having a bandwidth of less than the transmission bit rate of the transmitter, and
providing an optical transmission link having residual dispersion,
modifying the transmission link such that the residual dispersion of the transmission link substantially compensates for signal distortion from the transmitter, the effect of residual dispersion combined with that of the low bandwidth modulator in order to achieve a low pass filtering operation without additional electrical filters and wherein the absolute value of the residual dispersion of the optical transmission link is greater than $$\left(\frac{10 \text{ Gb/s}}{\text{bit rate}}\right)^2 \times 600 \text{ ps/nm}.$$

20. The method of claim 19 wherein the absolute value of the residual dispersion of the optical transmission link is below about $$\left(\frac{10 \text{ Gb/s}}{\text{bit rate}}\right)^2 \times 3500 \text{ ps/nm}.$$

21. The method of claim 19 wherein the modulator bandwidth is less than about 60% of the transmission bit rate of the optical transmission system.

22. A method for providing optical duobinary transmission comprising:

transmitting an optical duobinary signal using a transmitter which includes a low bandwidth modulator having a bandwidth of less than the transmission bit rate of the transmitter and being adapted to provide filtering for low pass filtered duobinary transmission over a transmission link having residual dispersion; and operating the transmission link such that the residual dispersion of the transmission link substantially compensates for signal distortion from the transmitter, the effect of residual dispersion combined with that of the low bandwidth modulator in order to achieve a low pass filtering operation without additional electrical filters and wherein the absolute value of the residual dispersion of the optical transmission link is greater than $$\left(\frac{10 \text{ Gb/s}}{\text{bit rate}}\right)^2 \times 600 \text{ ps/nm}.$$

23. The method of claim 22 wherein the absolute value of the residual dispersion of the optical transmission link is below about $$\left(\frac{10 \text{ Gb/s}}{\text{bit rate}}\right)^2 \times 3500 \text{ ps/nm}.$$

24. The method of claim 22 wherein the modulator bandwidth is less than about 60% of the transmission bit rate of the optical transmission system.

* * * * *